R. L. EVANS.
DOUBLE PRESSURE VENT VALVE FOR ANGLE COCKS.
APPLICATION FILED AUG. 18, 1920.

1,385,122.

Patented July 19, 1921.

R. L. Evans, Inventor
By Watson E. Coleman, Attorney

UNITED STATES PATENT OFFICE.

ROBERT L. EVANS, OF ROANOKE, VIRGINIA.

DOUBLE-PRESSURE VENT-VALVE FOR ANGLE-COCKS.

1,385,122.   Specification of Letters Patent.   Patented July 19, 1921.

Application filed August 18, 1920. Serial No. 404,310.

*To all whom it may concern:*

Be it known that I, ROBERT LEE EVANS, a citizen of the United States, residing at Roanoke, in the county of Roanoke and State of Virginia, have invented certain new and useful Improvements in Double-Pressure Vent-Valves for Angle-Cocks, of which the following is a specification, reference being had to the accompanying drawings.

This invention relates to valves, and particularly to a valve which, while adapted for use in a variety of different situations, is particularly designed for use with the angle cocks of air brake systems.

Trains having air brake systems, particularly freight trains where the angle cocks are exposed, are liable to have the brakes applied by tramps riding on the trains who desire to cause the trains to slow down or stop so that they may land therefrom. The tramp or other person simply turns the angle cock and brings the train to a stop by an application of the brakes. Oftentimes, however, the air brake is not brought to a stop for a considerable time after the angle cock has been turned and the engineer is unaware of the fact that the angle cock has been turned, and if he desires to apply the brakes between the time that the angle cock is turned and the time when the train is brought to a full stop, he finds that he has no power to apply the brakes on that portion of the train line which is rearward of the angle cock which has been turned. This has led to many accidents, particularly on down grades.

The general object of my invention is to provide a valve for use with the angle cocks which, when the angle cock has been turned to cut off the train line, will cause the brakes to be applied to the cars to bring the train to a full stop provided the train line is properly charged.

A further object is to provide a valve so constructed that it will apply the brakes of all cars that have been detached from the train that have a charged train line.

A further object is to provide a valve which is rendered operative when the train line is cut through and which cannot in any manner interfere with the working of the air brake.

A further object is to provide a valve of this character which is so constructed that it responds and vents the train line when there is a given pressure in the train line on each side of the valve but which is inactive when pressure below the pressure of the spring acting on the valve is exerted on only one side of the valve.

A further object is to provide a valve of this character which in "double heading" will give an engineer on the second engine absolute control of the train brake at any time it may be needed and which can be so operated as to allow the operator on the second engine to assist in recharging should it be necessary.

Another object is to provide a valve which may be made as part of the angle cock or as an attachment thereto, and which may be disposed either within the angle cock or exterior thereto.

Other objects will appear in the course of the following description.

My invention is illustrated in the accompanying drawings, wherein I have shown the device as applied to the common angle cock of an air brake train line;

Figure 1:
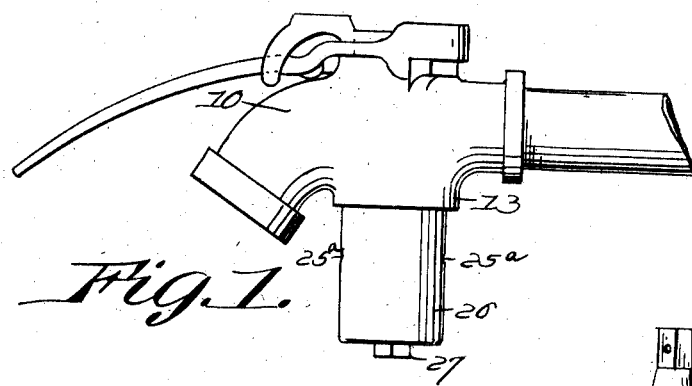
Figure 1 is a side elevation of an angle cock with my vent valve applied thereto.
Figure 2:
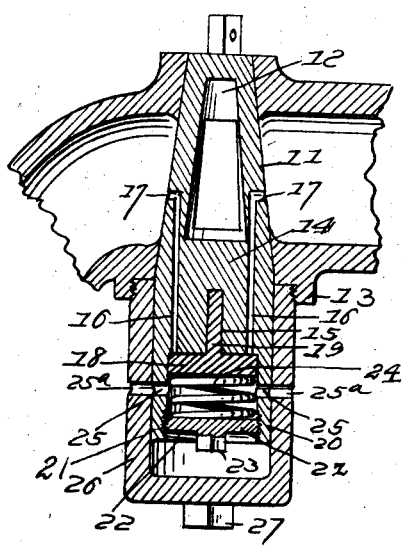
Fig. 2 is a longitudinal fragmentary vertical sectional view of the angle cock and my improved vent valve.
Figure 3:
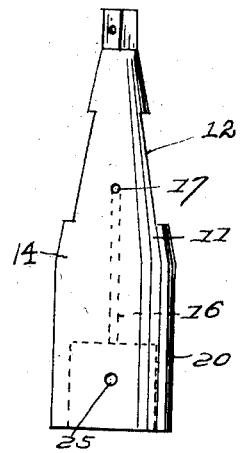
Fig. 3 is an elevation of the rotatable valve removed from the angle cock and showing the ports.
Figure 4:
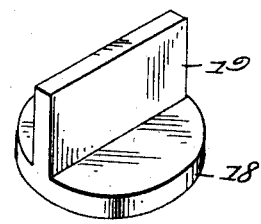
Fig. 4 is a perspective view of the valve 18.

Referring to the drawings, 10 designates the usual casing of the angle cock and 11 the tapering rotatable valve therein provided with the usual transversely extending port 12. The casing 10 of the angle cock is formed concentric to the valve with the outwardly projecting, interiorly screw-threaded flange 13 with which the cap is usually engaged.

Preferably formed as part of the valve 11 and extending downward therefrom is a centrally arranged hub 14 which is formed with a diametrically extending, relatively deep kerf or groove 15. On each side of this groove this hub 14 is formed with longitudinally extending ducts or ports 16 which extend upward through the side walls of the valve 11 and open upon the exterior face of the valve at diametrically opposite points, as at 17. The axes of these ports 17 are, of course, at right angles to the axis of the port 12. Thus when the valve 11 is turned so that the port 12 is blanked or shut off and communication cut off between the opposite train line on opposite sides of the valve, the ports 17 will be opened to the train line on opposite sides of the valve 11.

Operating in conjunction with the hub 14 is a disk-shaped valve 18 which is of metal and which has a central, diametrically extending lug or web 19 fitting the groove 15 but preferably having a height equal to the depth of the groove. The hub 14 is extended downward, as at 20, around the valve 18 to form a chamber for the valve, and the lower end of this portion 20 is preferably interiorly screw-threaded, as at 21, for engagement by a screw-threaded plug 22 having a lug 23 whereby the plug may be rotated and thereby adjusted nearer to or farther from the valve 18. Disposed between the valve 18 and this plug is a coiled spring 24 which bears against the valve and holds it up with the upper end of the lug 19 engaged against the bottom of the groove 15. The portion 20 of the hub 14 is formed with two diametrically disposed ports 25 which are disposed below the normal position of the valve 18 but which, when the valve 18 is forced downward a sufficient distance, communicate with the ducts or ports 16.

Surrounding and inclosing the portion 14 and the portion 20 and having screw-threaded engagement at its upper end with the flange 13 is a relatively deep cap 26 having means 27 on its extremity whereby a wrench may be applied thereto to remove it, and this cap is also provided with ports 25ª which register with the ports 25. The only object of the cylindrical extension 20 of the member 14 is to provide means whereby the plug 22 may be supported in such manner that the plug 22 may be adjusted inward or outward to thereby regulate and adjust the tension of the spring 24. This portion 20 and the plug 22, therefore, may be done away with, if desired, and the spring rest directly upon the lower end of the cap 26.

The spring 24 has a pressure sufficient to resist a train line pressure of from 70 to 90 pounds. For instance, the spring 24 may be set or adjusted to have a pressure of 150 pounds. If, therefore, we assume that the train line is charged at a pressure of 90 pounds, then it will be obvious that when the valve 11 of the angle cock is turned to cut off the passage of the train line air through the port 12, there will be 90 pounds pressure on both sides of the valve 11, and this 90 pounds pressure on each side of the valve 11 will pass down through the ports 17 and bear upon the valve 18 on both sides of the transverse web or lug 19. Therefore, there will be a pressure of 180 pounds acting on the valve 18 to force it downward against the force of the spring which has been assumed to be set at 150 pounds tension. The 180 pounds pressure of air acting on the valve 18 will force it outward and through the ports 25 and 25ª and thus allow the escape of 30 pounds of air from both sides of the train line, which will apply the brakes fully on all cars behind the angle cock and partially apply them on all cars ahead of the turned angle cock. Of course, it will be understood that the angle cock on the rear of the train will not be affected, as there is only there a train line pressure of 90 pounds passing through one of the ducts or ports 17 and bearing on the valve, which will not shift the valve against the 150 pounds pressure exerted by the spring 24.

It will be noted that this is a "double pressure" valve, in that it is only when pressure is applied on both sides of the web or lug 19 that the valve 18 will open, and it is also obvious that the pressure does not have to be equal on both sides of this web 19. Thus a 140 pounds of any given pressure on one side of the web 19 and 10 pounds on the other side of the web will overcome the spring tension of 150 pounds of spring 24. Furthermore, it is to be noted that steam may be used on one side of the valve and air on the other, and that as a matter of fact the valve can be operated by either air, steam, water, or oil. The valve may be made as a permanent part of angle cocks or can be attached to angle cocks now in use. There are two angle cocks at each hose coupling, one at one end of the hose coupling and one at the other, and under ordinary circumstances and with the valve set for operation under ordinary circumstances, this valve would not operate properly if both of the angle cocks were turned at exactly the same moment for the reason that there would be air trapped between the angle cocks and this air might not be of sufficient pressure to force down the valve 14 against the pressure of the spring in connection with the air on the train line on the opposite side of the angle cocks, but should it be desired to so arrange the angle cocks that this vent valve would open should both the angle cocks be turned at the same time, then the spring 24 can be so tensioned that the vent valve 18 will be forced down by the pressure which is trapped between the two turned angle cocks and the pressure on the opposite side of the valve and thus cause the brakes to be applied. The coincidental closing of both angle cocks at the same time would not be likely to occur, but I merely wish to indicate that the valve could be adjusted to take care of this situation if desired.

While I have particularly designed this valve for use with the angle cocks of air brakes, it is to be understood that I do not wish to be limited to this, as this valve may be used in many different circumstances where it is desired to prevent the operation of the valve under normal circumstances but permit this same pressure to actuate the valve under certain other circumstances. Neither do I wish to be limited to the details of construction. As before remarked, the valve casing constituted by the cap 26 may be disposed on the side of the angle cock and be connected by the port 16 to port 17 on the outer face of valve 11.

While I have heretofore referred to the fact that there is a pressure of 90 pounds on the valve on one side of the partition or web 19 and a pressure of 90 pounds on the other side of the web, as a matter of fact, while when the rotatable valve is closed, there is only a pressure of 90 pounds on both sides of the web, yet where the pressure only passes through one of the ports in the rotatable valve and not through the other port, as for instance on the end angle cock of a train, there this pressure of 90 pounds only acts on a certain number of square inches. In other words, one-half the size of the face of the valve, but where both of the ports receive the pressure of 90 pounds, then practically the entire surface of the valve is acted on by the pressure of 90 pounds so that in effect it is as if the pressure was halved in the first case and as if the pressure was doubled in the second case, and it is to be understood that the spring is to have sufficient tension to hold the valve 18 in its closed position against the force of pressure acting on only one side of the valve 18, but that the spring will be compressed by a pressure acting on both sides of the valve 18, that is on both sides of the partition web 19.

While I have heretofore described my valve with special reference to its use as a vent valve for the angle cocks of air brakes, it is to be understood that this valve when placed in the train line connection, and preferably adjacent the engine cab, may also be used for controlling the air brakes when "double heading." If a valve of this construction were placed in the train line of the engine somewhere between the cap and the pilot, then whenever two engines were coupled together, the train line pressure carried on the leading engine would be at all times against one side of the valve 18, that is on one side of the web 19. Then if the engineer on the second engine desired to take charge of the brakes, he would simply turn the main reservoir pressure onto the other side of the valve, which would force the valve 18 from its seat and vent the train line, the main reservoir pressure being always 50 pounds greater than the train line. In this case, however, that is where these valves are to be used for double heading, the body of the valve or the height of the web 19 would have to be increased. It will be understood, of course, that the casing of the vent valve under these circumstances will not be disposed in connection with an angle cock but in the casing disposed within the train line, both the angle cock and the train line section on which the valve is placed constituting a hollow member adapted to contain fluid under pressure.

I claim:—

1. The combination with a hollow member adapted to contain fluid under pressure and having a rotatable valve therein in one position permitting passage of fluid and in the other position preventing passage of fluid through the hollow member, of a vent valve yieldably urged to its seat but opening to permit the escape of fluid from the hollow member on both sides of the rotatable valve when the rotatable valve is turned to a position to prevent the passage of fluid through the hollow member.

2. The combination with a hollow member adapted to contain fluid under pressure and having a rotatable valve therein in one position permitting passage of fluid through the hollow member and in the other position preventing the passage of fluid therethrough, of a valve operable by the combined pressure on both sides of the rotatable valve permitting the escape of fluid from the hollow member on both sides of the valve when the valve is turned to a position to prevent passage of fluid through the hollow member.

3. The combination with a hollow member adapted to contain fluid under pressure, and a rotatable valve therein in one position permitting the passage of fluid and in its other position preventing the passage of fluid, of a valve casing associated with the hollow member, there being ducts leading from opposite faces of the rotatable valve into said valve chamber, the valve casing having ports leading to the exterior of the casing, and a spring actuated valve normally preventing the passage of fluid through said ducts and out of said ports but shiftable in a direction to connect said ports with the ducts by pressure of fluid on both sides of the rotatable valve when the rotatable valve is turned to a position to prevent the passage of fluid through the hollow member.

4. The combination with a hollow member adapted to contain fluid under pressure and having a rotatable valve therein in one position permitting the passage of fluid and in its other position preventing passage of fluid through the hollow member, of a valve casing having ports leading to the exterior of the valve casing, a spring actuated valve normally preventing the discharge of fluid through said ports, and means causing the valve to be subjected to the action of the fluid pressures on opposite sides of the rotatable valve to thereby cause the opening of said second named valve when the rotatable valve is disposed in a position to prevent passage of fluid through the hollow member.

5. The combination with an angle cock having a rotatable valve in one position permitting the passage of fluid through the angle cock and in another position preventing passage of fluid therethrough, of a vent valve operable by the combined air pressure on opposite sides of the rotatable valve upon a rotation of the rotatable valve to a position to prevent the passage of fluid, said valve when operated connecting the angle cock on both sides of the rotatable valve with the exterior air.

6. The combination with an angle cock having a rotatable valve in one position permitting passage of fluid under pressure through the angle cock and in another position preventing passage of said fluid, and a valve casing having ducts leading to and opening upon opposite faces of the valve and communicating with the opposite portions of the angle cock when the valve is closed, said valve casing having ports communicating with the outside air, a longitudinally shiftable valve mounted within the valve casing, a spring holding the valve in a position between said ducts and the ports, the valve being shiftable against the action of said spring to a position to open communication between the ducts and ports, said valve having a medial partition web cutting off communication between one side of the valve and the other side of the valve, and the ducts leading to opposite sides of said web whereby the valve will be subjected to pressure from both sides of the angle cock when the rotatable valve therein is turned to a position preventing passage of fluid through the angle cock.

7. The combination with an angle cock, of a vent valve therefor, and a spring holding said valve closed, and means for subjecting the valve to the pressures of the fluid on opposite sides of the rotatable valve of the angle cock when the rotatable valve is shifted to close communication between the two ends of the angle cock, said spring being strong enough to resist the movement of the second named valve when subjected to pressure from one side of the angle cock but yielding when subjected to combined pressures on opposite sides of the closed angle cock.

8. The combination with an angle cock having a rotatable valve therein in one position opening passage through the angle cock and in another position closing passage through the angle cock, of a vent valve for the angle cock, and a spring holding said valve closed against normal train line pressure, and means whereby when the angle cock is closed the valve will be subjected to two pressures on opposite sides of the rotatable valve to thereby cause the opening of the second named valve and the venting of the train line.

9. The combination with an angle cock having a rotatable valve therein formed with a transversely extending passage, of a valve casing associated with the angle cock and having therein a member formed with a diametrical groove, said member being rotatable with the rotatable valve, there being ducts opening upon opposite faces of the valve on each side of the passage and at right angles thereto, said ducts extending through said member and opening on each side of the groove, a valve fitting the valve casing and having therein a diametrically extending web fitting in said groove, and a spring disposed in the valve casing and urging said valve toward said member, the valve casing being provided with vent ports uncovered when the valve is forced toward the outer end of the valve casing and away from said member.

10. The combination with an angle cock having a rotatable valve formed with a diametrically extending passage, of a valve casing, a member connected to the valve to rotate therewith and disposed within said valve casing, said member having a medially disposed diametrical groove, there being ducts leading from diametrically opposite faces of the rotatable valve downward therethrough and through said member and opening upon the face of the member, one on each side of the groove, said ducts opening upon the face of the rotatable valve at right angles to the axis of the passage, a valve disposed within the valve casing and fitting the same and having a medially disposed web fitting said groove, a spring disposed within the valve casing and bearing against the valve and urging it toward said member, and means disposed within the valve casing for adjusting the tension of the spring.

11. A valve mechanism of the character described including a valve casing having ports, a valve disposed in said casing, a seat for the valve, a spring normally urging the valve against said seat and away from said ports, the valve having a diametrically extending, medially disposed web, and the seat having a diametrically extending, medially disposed groove into which said web at all times extends, and ports opening at one of their extremities in opposite directions, the ports extending through the seat and at their other extremities opening upon the face of the seat confronting the valve on each side of said web and groove.

12. In a valve structure, a valve and a valve casing, said valve casing including a member forming a valve seat, and means urging the valve against its seat, the valve and member having one a transversely extending recess and the other a transversely extending web fitting in the recess, said web dividing the space between the face of the valve and its seat into two parts, the valve casing having ducts opening upon the seat, one on each side of the recess and web.

13. In a valve structure, a valve, a member forming a valve seat, a spring urging the valve against its seat, and means for regulating the tension of said spring, the valve and member on their confronting faces having one a transversely extending recess and the other a transversely extending web fitting the recess, the web dividing the space between the confronting faces of the valve and valve seat into two parts, there being ducts opening into the space between the confronting faces of the valve and seat, the ducts being disposed one on each side of the recess and web.

In testimony whereof I hereunto affix my signature.

ROBERT L. EVANS.